June 12, 1928.  1,673,605
C. O. TAPPAN ET AL
HYDRAULIC TURBINE
Filed Sept. 14, 1921  3 Sheets-Sheet 1
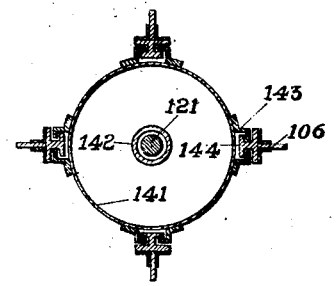
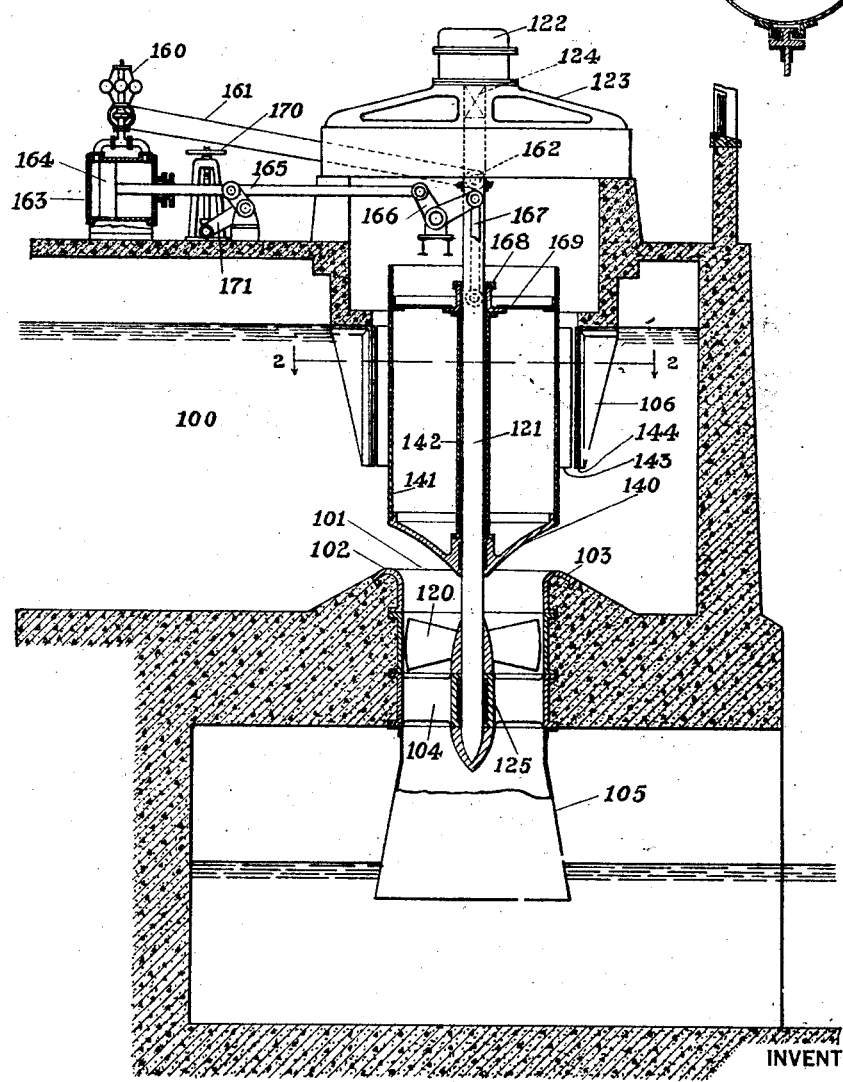
INVENTORS
CHARLES O. TAPPAN AND BENJAMIN G. FERNALD
BY
Prindle, Wright and Small
THEIR ATTORNEYS June 12, 1928.
C. O. TAPPAN ET AL
1,673,605
HYDRAULIC TURBINE
Filed Sept. 14, 1921
3 Sheets-Sheet 2
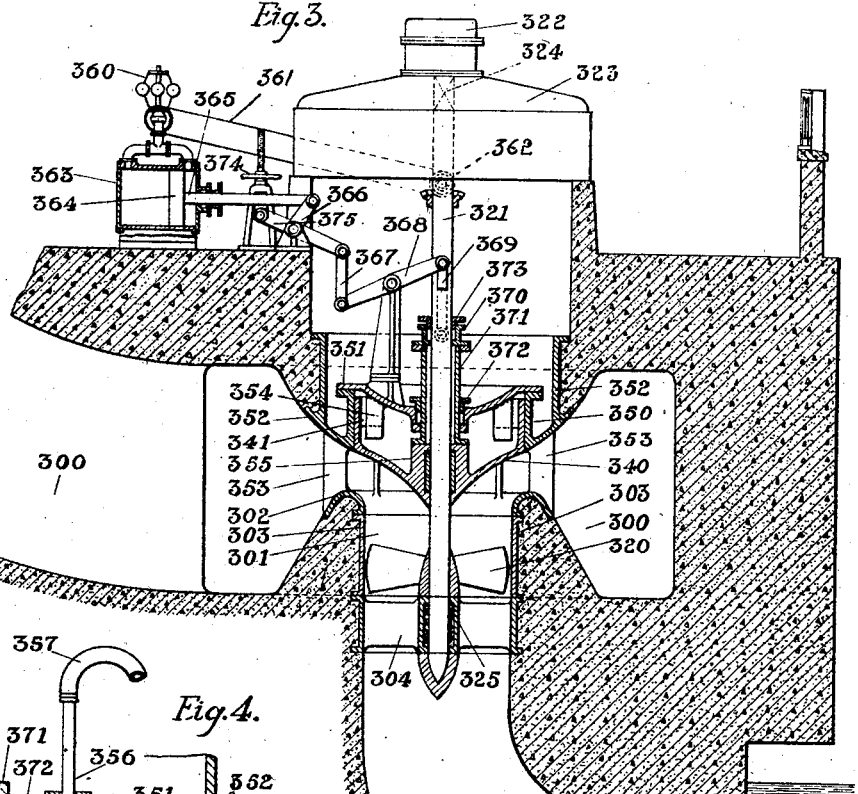
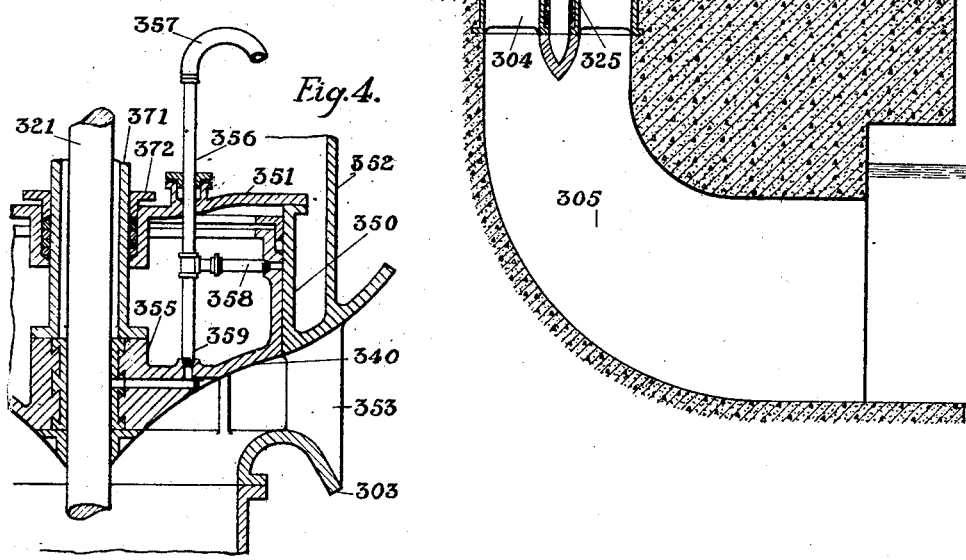
INVENTORS
CHARLES O. TAPPAN AND BENJAMIN G. FERNALD
BY
Prindle, Wright and Small
THEIR ATTORNEYS

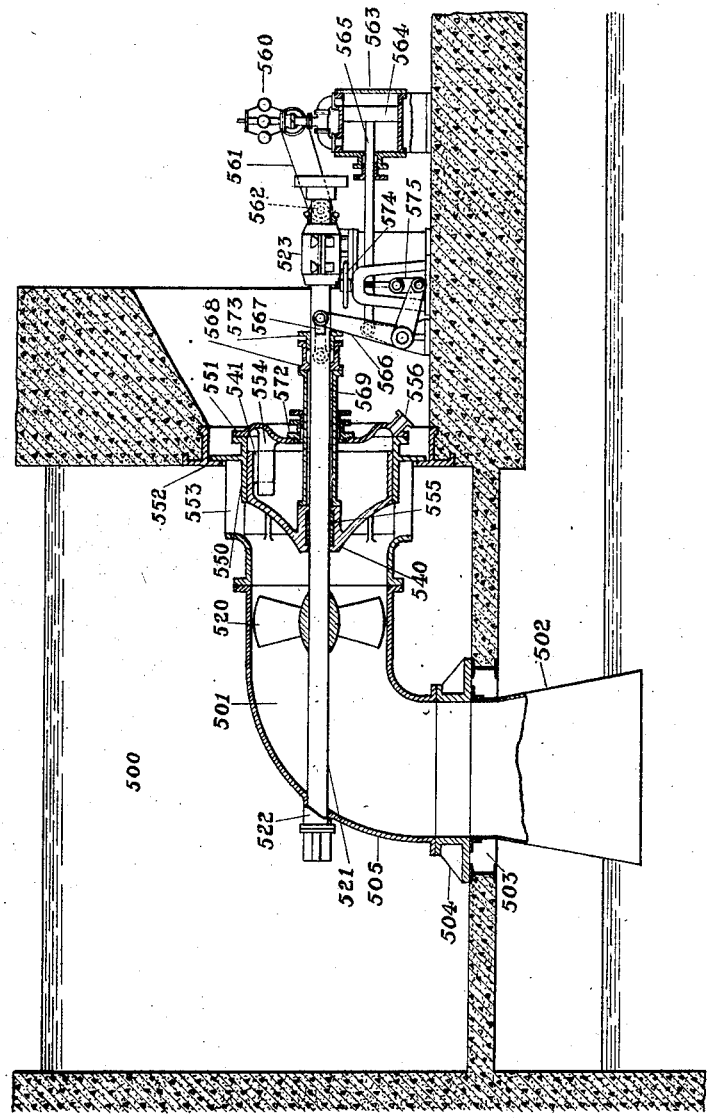

Patented June 12, 1928.

1,673,605

UNITED STATES PATENT OFFICE.

CHARLES O. TAPPAN AND BENJAMIN G. FERNALD, OF NEW YORK, N. Y.

HYDRAULIC TURBINE.

Application filed September 14, 1921. Serial No. 500,566.

Our invention relates to hydraulic turbines and has for its object to provide an efficient hydraulic turbine installation which is inexpensive to construct and to maintain.

For purposes of illustration, the invention will be described in connection with a hydraulic turbine wheel or runner of the axial flow type similar to a marine or screw propeller. A typical turbine installation of this type comprises a flume connecting with the head water at the top of the waterfall, a passageway connecting with the flume and in which the turbine wheel or runner is mounted, and a draft tube or other discharge conduit to convey the water from the runner passageway to the tailrace at the foot of the waterfall. The admission of water to the flume from the top of the waterfall is controlled by large gates of any desired kind. To regulate the speed of the turbine within desired limits, the flow of water to the runner is controlled by easily manipulated gates or valves provided adjacent the runner or the runner passageway. The so-called wicket-gate control, comprising a series of small vanes or blades connected by links to a common shifting or actuating ring rotated by levers controlled by hand or by a speed governor, is a common type of speed regulating device. Although the wicket-gate control is efficient and easy to operate, it is complicated and expensive to manufacture, install, and maintain. It is one of the objects of the present invention, therefore, to provide a simple and efficient speed regulating gate or valve, inexpensive to manufacture, install, and maintain.

Other and further objects of invention will be apparent from the following description and from the accompanying drawings of illustrative embodiments thereof, in which Figure 1 is a longitudinal, vertical section of an embodiment of the invention applied to an open flume, downward flow turbine installation;

Figure 2 a horizontal section taken on line 2—2 of Figure 1 looking in the direction of the arrows;

Figure 3 a longitudinal, vertical section of an embodiment of the invention applied to a closed, spiral flume, downward flow turbine installation;

Figure 4 an enlarged detail of a portion of the speed regulating valve illustrating a method of lubrication; and Figure 5 a longitudinal, vertical section of an embodiment of the invention applied to an open flume, horizontal flow turbine installation.

The application of the invention to other types of flow and of installations will be obvious from its application to the illustrative embodiments of Figures 1 and 5 of the drawings.

Similar reference characters refer to similar parts throughout the drawings.

An important feature of the invention consists in the provision of an axial flow runner set definitely in the axis of a cylindrical conduit to the inlet end of which the water is admitted at sufficient distance from the runner to permit the latter to turn in and be operated by a solid body of water moving through the conduit in an axial direction without whirl or other turbulence excepting that small amount which is unavoidable when the direction of the flow of water is changed or the water is set in motion for any reason.

Figures 1 and 2 of the drawings illustrate the application of one embodiment of the invention to an open flume, downward flow installation in which an open flume 100 conveys water from the top of the waterfall (not shown) to a vertical passageway 101 having its top 102 flared and shaped to cooperate with and to form a seat for the speed regulating valve 140 to be described hereinafter. The passageway may be reinforced with a casing ring 103 shaped to conform to the passageway and its top 102. A draft tube or suction pipe 105 conveys the discharge water from the bottom of runner passageway 101 to the tailrace at the foot of the waterfall.

The turbine wheel or runner 120, which is shown as of the axial flow or marine screw propeller type, is mounted in runner passageway 101 on a vertical shaft 121. In the embodiment illustrated, shaft 121 hangs from a thrust bearing 122 carried by the generator 123 or other apparatus to which the turbine is connected. A guide bearing 124 mounted in the frame of the generator may be provided for the top of the shaft and a guide bearing 125 mounted in a spider 104 secured to or forming part of casing ring 103 may be provided for the bottom of the shaft.

To regulate the speed of runner 120 by controlling the flow of water thereto, a simple and efficient valve inexpensive to manufacture, install, and maintain has been provided comprising a needle valve 140 mounted slidably on or about shaft 121 and formed to seat on top 102 of runner passageway 101. The bottom of the needle valve preferably is formed and shaped to cooperate with flaring top 102 of runner passageway 101 to aid in securing efficient and shockless entrance of the water into passageway 101. A pointed or conical end is shown in the drawings. In the installation illustrated, needle valve 140 preferably is provided with sides 141 and with a sleeve 142 extending above the level of the head water in open flume 100, thus excluding water from the top of the valve. Water on top of the valve would tend to unbalance it, and would require more force to raise it from its seat than if the water is excluded. To prevent rotation of the needle valve, longitudinal slideways 143 may be provided on its sides 141, adapted to receive slides 144 provided on extensions 106 from the flume structure.

Needle valve 140 may be raised and lowered by a speed governor or by hand. A conventional speed governor 160 is illustrated in Figure 1 of the drawings, connected by a belt 161 with any moving part 162 of the installation. The governor controls liquid flow into a cylinder 163 on either side of a piston 164 connected by a piston rod 165 with a bell crank lever 166 connected by a link 167 with a collar 168 fastened to sleeve 142 and to a spider 169 which is secured to sides 141 of needle valve 140 or to extensions from said sides. Hand operation of the needle valve may be provided in any desired manner as by a screw wheel 170 connected by a bell crank lever 171 to piston rod 165.

In Figures 3 and 4 of the drawings is illustrated the application of an embodiment of the invention to a closed, spiral flume, downward flow installation in which a closed, spiral flume 300 conveys water to a vertical passageway 301 having its top 302 flared and shaped to cooperate with and to form a seat for the speed regulating valve 340 to be described hereinafter. The passageway may be reinforced with a casing ring 303 shaped to conform to the passageway and its top 302. A draft tube 305 conveys the discharge water from the bottom of the runner passageway.

The turbine wheel or runner 320 is mounted in runner passageway 301 on or about vertical shaft 321 hung from a thrust bearing 322 carried by the generator 323 or other apparatus to which the turbine is connected. A guide bearing 324 mounted in the frame of the generator may be provided for the top of the shaft and a guide bearing 325 mounted in a spider 304 secured to or forming part of casing ring 303 may be provided for the bottom of the shaft.

To regulate the speed of runner 320 by controlling the flow of water thereto, a needle valve 340 is mounted slidably on shaft 321 and formed to seat on top 302 of runner passageway 301. The bottom of the needle valve may be formed and shaped to cooperate with flaring top 302 of runner passageway 301 to aid in securing entrance of water into passageway 301 with as little shock and disturbance as possible. In the installation illustrated the needle valve is mounted slidably and with a close fit in a drum or valve casing 350 having a top 351 and attached to or forming part of a surrounding casing ring 352 secured to the flume structure and connected by distance pieces 353 with lower casing ring 303 forming what may be termed a speed ring to guide the water entering passageway 301. Lower casing ring 303, distance pieces 353, upper casing ring 352, and valve enclosing drum 350 may be integral or sectional as may be most convenient for the particular installation for which they are intended. The distance pieces 353 are not so constructed as to cause a whirling motion. Rotation of the needle valve may be prevented in any desired manner as by a guide 354 on cover 351 engaging an extension 341 of needle valve 340. In Figure 4 is shown means for lubricating the bearing 355 around shaft 321 in the needle valve, and the sides of the needle valve, comprising a pipe 356 connected by a flexible tube 357 to a lubrication source and having branches 358 and 359 leading respectively to the sides of the needle valve and to bearing 355 at the bottom of the valve around shaft 321.

Needle valve 340 may be raised and lowered by a speed governor or by hand. A conventional speed governor 360 is illustrated, connected in any desired manner as by a belt 361 with any desired moving part 362 of the installation. The governor controls liquid flow into a cylinder 363 on either side of a piston 364 connected by a piston rod 365 with a bell crank lever 366 connected by a link 367 with a lever 368 connected by a link 369 with a collar 370 fastened to a sleeve 371 secured to bearing 355 of needle valve 340. A stuffing box 372 may be provided between sleeve 371 and top 351 of drum 350 and a stuffing box 373 between collar 370 and shaft 321. Hand operation of the needle valve may be provided by a screw wheel 374 connected to an extension 375 of bell crank lever 366.

In Figure 5 of the drawings is illustrated the application of an embodiment of the invention to an open flume, horizontal flow installation in which an open flume 500 has mounted therein a horizontal runner passageway 501 curving to a discharge conduit 502 leading from an opening 503 in the floor of the flume. About flume opening 503 is set a flume ring 504 to which is bolted the runner casing 505 provided with an opening flared and shaped to cooperate with and to form a seat for the speed regulating valve 540 to be described hereinafter.

The turbine wheel or runner 520 is mounted in runner passageway 501 on or about horizontal shaft 521 mounted in bearings 522 and 523.

To regulate the speed of runner 520 by controlling the flow of water thereto, a needle valve 540 is mounted slidably on shaft 521 and formed to seat on the flared opening of runner passageway 501. The end of the needle valve may be formed and shaped to cooperate with the flared opening of runner passageway 501 to aid in securing a shockless entrance of the water thereto. In the installation illustrated, the needle valve is mounted slidably and with a close fit in a drum 550 having a top 551. The drum or valve casing is secured to a surrounding casing ring 552 secured to the flume structure and is connected by distance pieces 553 with the flared entrance of runner passageway 501 to form what may be termed a speed ring through which the water is delivered from flume 500 to passageway 501 and to runner 520 therein. The pieces 553 are not constructed so as to cause a whirling motion of the water. Rotation of the needle valve may be prevented in any desired manner as by a guide 554 on cover 551 engaging an extension 541 of needle valve 540. A bearing 555 may be provided at the end of the needle valve and around shaft 521. For draining the valve chamber of any leakage, a drain valve 556 may be provided in cover 551.

Needle valve 540 may be moved toward and away from the entrance to runner passageway 501 by a speed governor or by hand. A conventional speed governor 560 is illustrated, connected by a belt 561 with any moving part 562 of the installation. The governor controls liquid flow into cylinder 563 on either side of a piston 564 connected by a piston rod 565 with one arm of a bell crank lever 566 connected by a link 567 with a collar 568 fastened to a sleeve 569 secured to bearing 555 of needle valve 540. A stuffing box 572 may be provided between sleeve 569 and top 551 of drum 550 and a stuffing box 573 between collar 568 and shaft 521. Hand operation of the needle valve may be provided by a screw wheel 574 connected by a link 575 to the arm of bell crank lever 566 to which piston rod 565 is not connected. The needle valve also may be operated hydraulically through valve 556 or similar means wherever the closed drum or valve casing is used, controlled by the usual form of hydraulic governor by automatic speed regulation or by hand.

Many modifications of our invention will be apparent to those skilled in the art without departing therefrom or from the scope of the claims, our invention not being limited to the embodiments or the applications thereof chosen for purposes of illustration, but comprising a hydraulic turbine installation and speed regulation control therefor inexpensive to construct and maintain.

What we claim and desire to secure by Letters Patent is:

1. In a hydraulic turbine, a flume having a cylindrical passageway normally open at both ends, a power shaft extending into said passageway and having an axial flow runner mounted thereon within said passageway, and means to close one end of said passageway comprising a needle valve slidably mounted on said shaft, the formation of the valve and passageway being such as to cause no whirl in the descending water.

2. The combination of claim 1 in which the needle valve is provided with means to prevent rotation thereof.

3. The combination of claim 1 in which the needle valve is provided with a pointed or conical end toward the entrance of the passageway.

4. In a hydraulic turbine, a flume having a cylindrical passageway normally open at both ends, a power shaft extending into said passageway and having an axial flow runner mounted thereon within said passageway, a fixed drum mounted in the flume and having one end thereof open, and a needle valve slidably mounted on said shaft and adapted to slide within said drum, the formation of the passageway and valve being such as to cause no whirl in the descending water.

5. In a hydraulic turbine, a flume having a cylindrical passageway normally open at both ends, a power shaft extending into said passageway and having an axial flow runner mounted thereon within said passageway, means to close one end of said passageway comprising a needle valve mounted adjacent said end, and means to guide said needle valve.

6. In a water wheel, a runner having radial blades, a cylinder enclosing said runner, the water inlet end of said cylinder being flared outwardly, and a movable valve at the inlet end of said cylinder cooperating with the flaring end of said cylinder to provide a water passageway so formed as to direct the water in an axial direction with relation to said runner.

7. In a water wheel, a runner having radial blades, a cylinder enclosing said runner, the water inlet end of said cylinder being flared outwardly, a movable valve at the inlet end of said cylinder cooperating with the flaring end thereof to provide an annular water passageway, said valve having its sides formed on curved lines so disposed as to direct the water from a radial direction as it enters said passageway to an axial direction with relation to said runner to direct the water from a substantially radial flow to an axial flow.

In testimony that we claim the foregoing, we have hereunto set our hands this 9th day of September, 1921.

CHARLES O. TAPPAN.
BENJ. G. FERNALD.